United States Patent Office 2,970,557
Patented Feb. 7, 1961

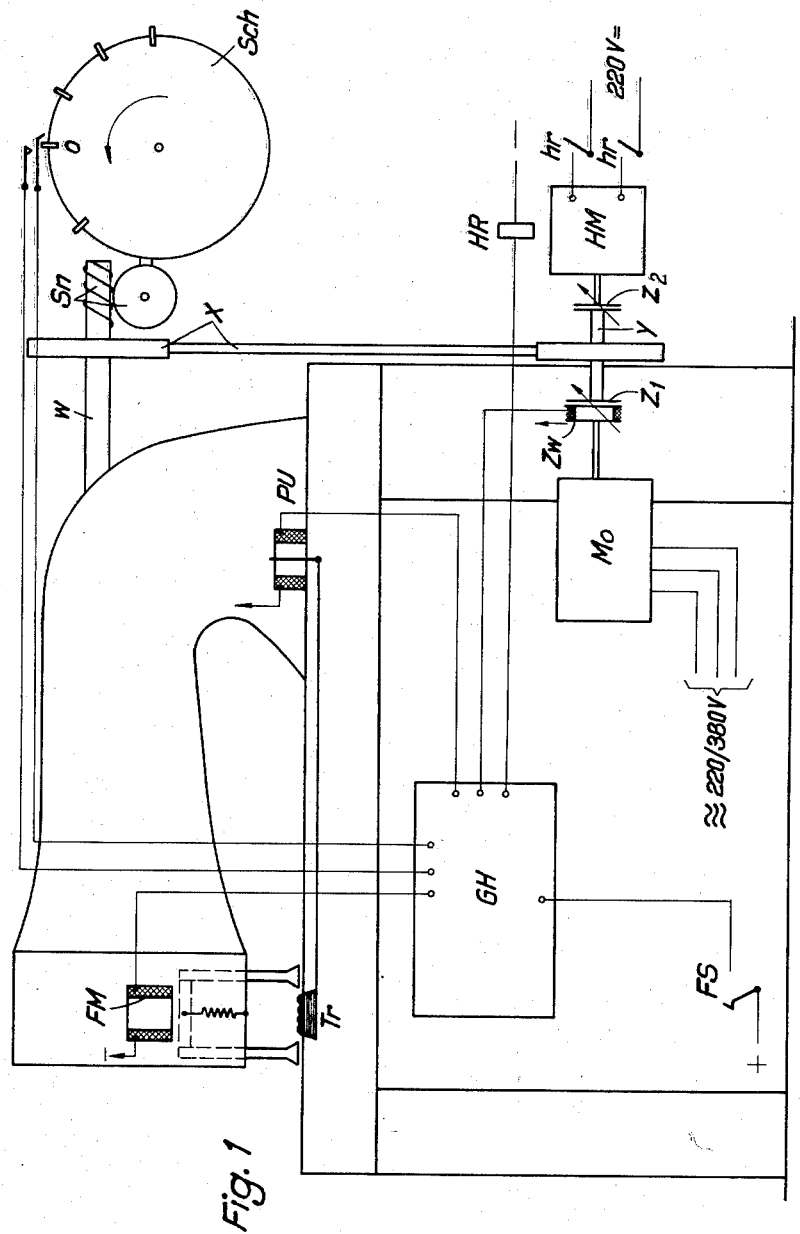

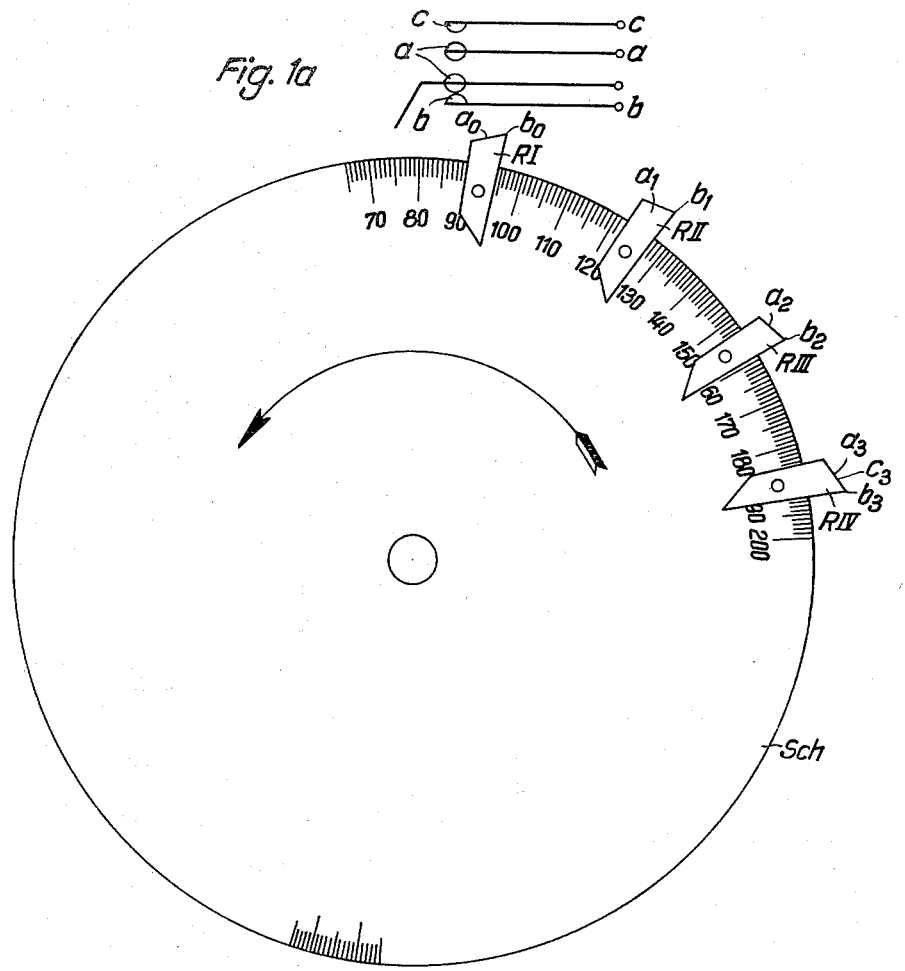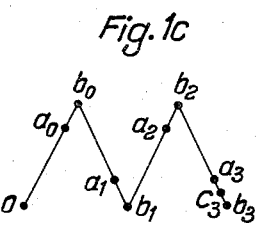

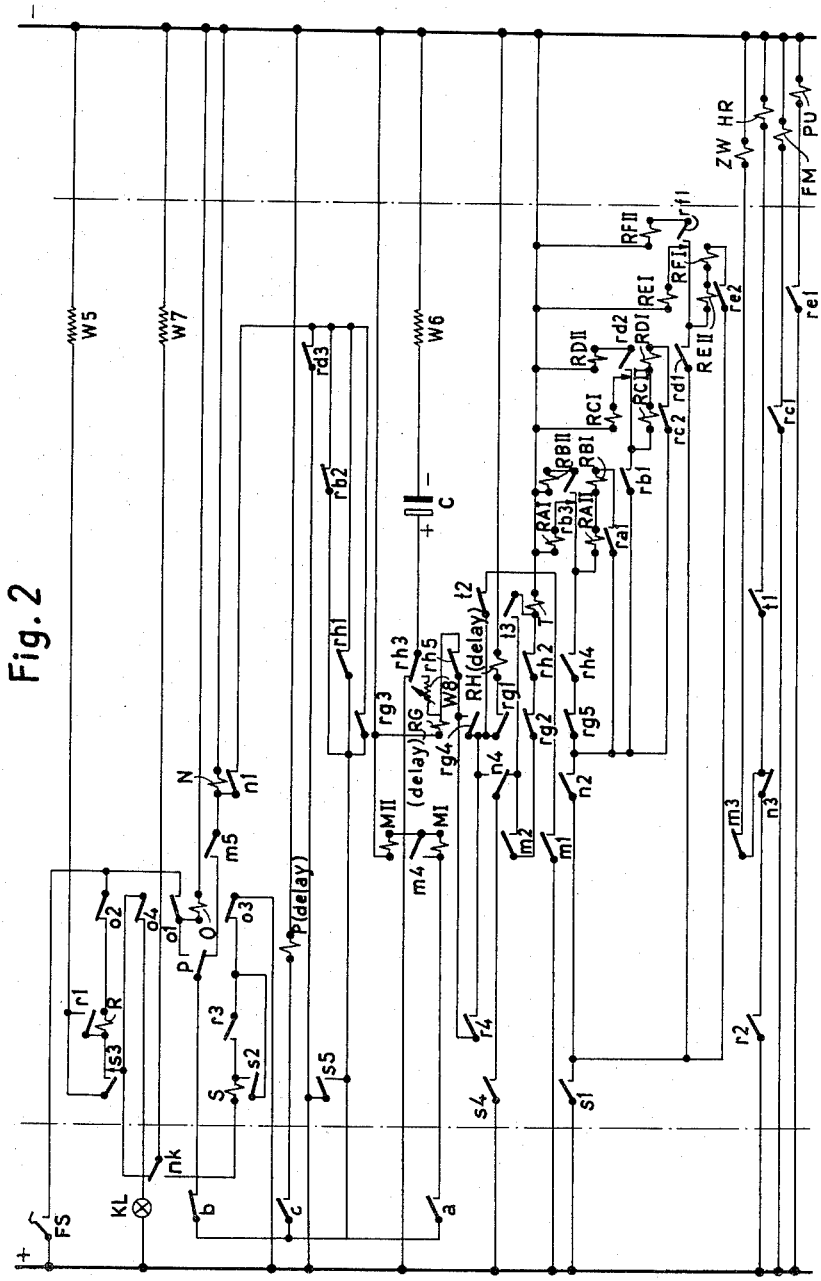

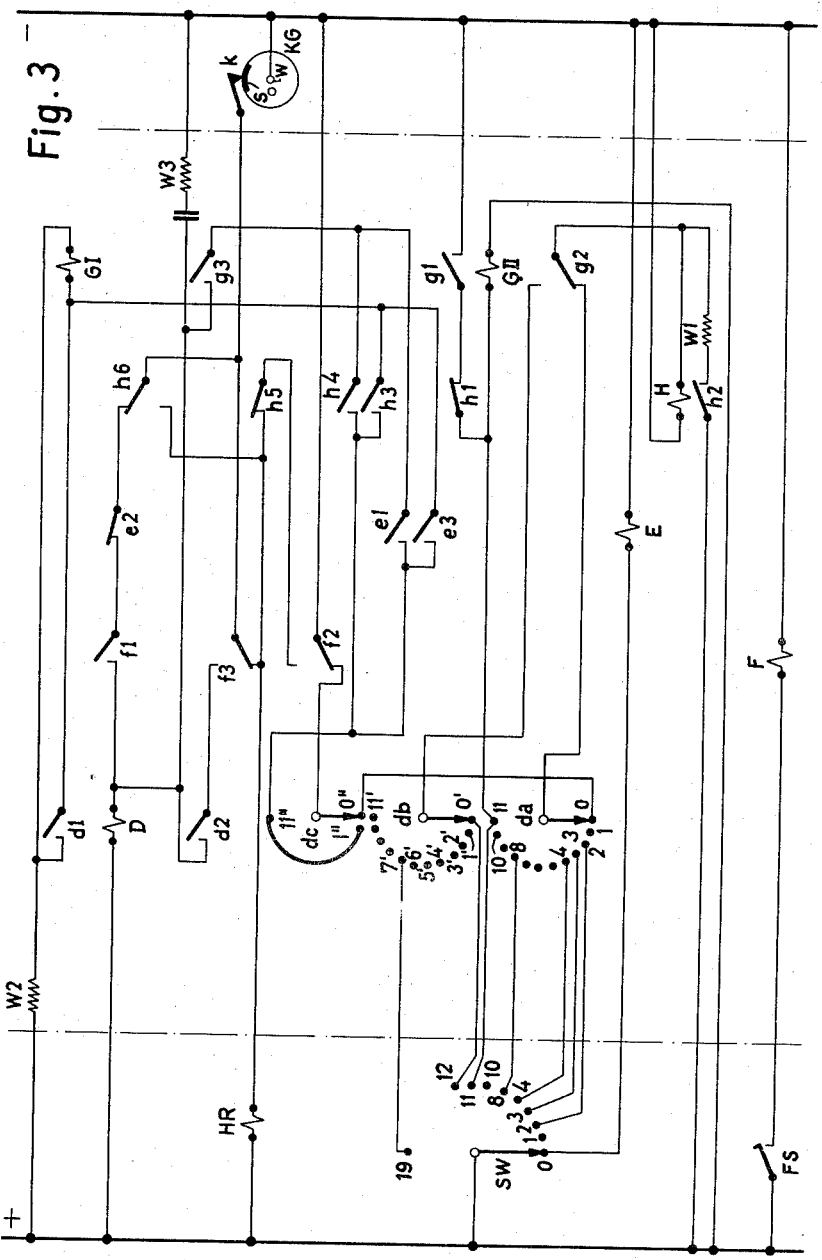

2,970,557

CONTROL DEVICE FOR THE OPERATION OF SEWING MACHINES

Max Schwab, deceased, late of Schwetzingen in Baden, Germany, by Brunhilde Schwab, heir, Verlaengerte Scheffelstrasse 55, Schwetzingen, Baden, Germany; Herbert Palloch, Schwetzingen, Baden, and Richard Kurz, Stuttgart, Germany; said Palloch and said Kurz assignors to Brunhilde Schwab Filed Feb. 12, 1957, Ser. No. 639,691

8 Claims. (Cl. 112—219)

This invention relates to sewing machines and provides an arrangement for controlling the number and direction of stitches automatically, so that sewing operations can be effected at high speed and with great accuracy.

According to the invention, a motor drive for the sewing machine is controllable by a pattern or schedule setting means by which the number of operations to be carried out in a direction or in each direction can be pre-set. The schedule setting means may either be directly coupled to the sewing machine drive or may operate with a repeater device actuated by the sewing machine, in combination with a corelating circuit which controls the performance of the operations in number and, if required, in direction.

The drive is preferably controlled by electrical means, for example a corelating circuit including relays, which are connected, on the one hand, to a selection means adjustable in accordance with the required program or schedule, for example a number of seams comprising predetermined numbers of stitches to be produced by the machine and, on the other hand, to a repeater device which is stepped forward by impulses produced by the machine on the completion of each stitch operation, the relays maintaining the drive until the machine has carried out the preset schedule. The selection means and the repeater device may advantageously be comprised of a rotary selector switch and electromagnetic step-by-step switching mechanism respectively. If desired, however, resistance transmitting means connected in a bridge circuit may be employed.

In a preferred embodiment of the invention, use is made of a disc or drum for setting the pattern, which disk or drum is driven by the sewing machine and provided with cam-like projections for actuating contact means, for example sets of spring contacts, in a relay system controlling the operation of the machine. Such a system may, if desired, control not only the period and direction of running, but also the speed of the motor drive. For example, use may be made, of a two speed pole-changing motor, or, preferably, two motors having different speeds. In the latter case, first the higher-speed motor and then the lower-speed motor is coupled to the shaft of the machine, so as to ensure that the machine performs the last stitches at relatively low speed and that the required number of stitches is not exceeded. Provision may be made to ensure that the last stitch operation is completed.

Further details of the invention will be apparent from the following description of embodiments illustrated by way of example in the accompanying drawings, in which:

Figure 1 shows diagrammatically the general arrangement of the essential control parts provided in a sewing machine, Figures 1a and 1b show separately and to a larger scale a schedule disc designed for a sewing pattern indicated in Figure 1c, Figure 2 shows an example of a control-circuit arrangement in which only relays are employed, and Figure 3 another example of a circuit arrangement comprising a selector switch pre-set in accordance with the sewing pattern.

In Figure 1, the sewing machine shaft $w$ is arranged to be driven by a belt drive $x$ from a shaft $y$ mounted, below the table of the machine, on the frame thereof. The shaft $y$ can be driven either at high speed with a clutch $Z_1$ by a main motor Mo or at substantially lower speed by way of a clutch $Z_2$ by an auxiliary motor HM. In this example, it is assumed that the main motor Mo is constantly energized. The auxiliary motor, on the other hand, is started and stopped by the contacts $hr$ of a relay HR. Normally, the clutch $Z_2$, which may be a friction clutch or a dog clutch, is engaged and the clutch $Z_1$ disengaged. The latter is an electromagnetic clutch and is engaged only when its winding $Zw$ is energized, the clutch $Z_2$ being then disengaged. The relays and associated components controlling the main and auxiliary motor drives are, in practice, arranged in a housing GH mounted in a suitable position below the machine table. The relays also control an electro-magnet FM for lifting the stepper, which presses the material to be sewn on to the top of the table, when the material is to be removed from the machine or turned into another direction.

A further electromagnet PU serves for mechanically reversing a feed dog $Tr$ so that it feeds the material in the said other direction. It is thus possible to sew forwards and backwards without turning the material through 180°.

Figure 1 further illustrates a pedal-operated switch FS which is disposed near the ground and must be held closed by the operator throughout the sewing operation and a schedule disc Sch which is arranged to be driven from the shaft $w$ by way of transmission gearing having a large reduction ratio, for example the worm gear Sn shown. For the sake of clarity, the disc Sch is drawn to the right of the worm wheel in Figure 1, but in practice it is mounted on the shaft of the worm wheel.

The schedule disc Sch is rotated by the shaft $w$ in the direction of the arrow from a zero position (Figure 1b) in which a cam NK, provided on the disc or the periphery of the worm wheel, bears against a push member associated with a set of spring contacts $nk$, so that the right-hand contacts are held closed. As soon as the disc commences to rotate, this set of contacts is changed over and the left-hand contacts are closed. 500 graduations are provided at regular angular intervals around the periphery of the disc Sch. Adjustable schedule-setting sliders RI to RIV mounted on the disc can be set with the aid of these graduations and can be secured, for example, by means of set screws. When the disc Sch rotates, the sliders successively actuate a set of spring contacts comprising a contact $b$, which is closed in the condition of rest, and operating contacts $a$ and $c$.

Figure 1c shows an example of a predetermined sewing pattern which can be fed by means of the disc Sch into the control circuit of Figure 2. This pattern is for a zigzag seam in which a predetermined number (to be precisely adhered to) of stitches must be made in each of several sections. For example, it may be a matter of sewing to a leather handbag a leather loop which is to serve as a handle.

Before carrying out the pattern of Figure 1c, the disc Sch must first be released from the worm wheel and turned back manually or automatically to the zero or initial position (Figure 1b) in which the right-hand contact $nk$ is closed and the pilot lamp KL lit up to indicate that the disc is in the zero position. The operator then closes the pedal switch FS, so that the main clutch $Z_1$ engages. The machine runs at high speed and sews from point O as far as the point $a_0$ (Figure 1c). At this instant, the inclined edge $a_0$ (Figure 1a) of the first slider RI acts on the set of contacts a—c so that contact a is closed. As will later be explained with reference to Figure 2, the main-motor drive is thereby disengaged and the auxiliary-motor drive is engaged in its place. The machine then sews at low speed as far as the point $b_0$. At this point, the inclined edge $a_0$ of the slider RI ends and the set of contacts a—c returns abruptly to its initial condition, so that the contact b is again closed. This results firstly in the immediate disconnection of the auxiliary-motor drive. In addition, the presser foot magnet FM (Figure 1) is energized at the same instant, so as to lift the presser foot and allow the material to be turned into the new direction of sewing. Finally, the magnet PU is energized to initiate backward feed of the material and the presser foot magnet is at once disconnected, so that the work is again pressed onto the table. The main-motor clutch $Z_1$ is then re-engaged, so that the machine sews at high speed along the section $b_0$—$a_1$. At $a_1$, the edge $a_1$ of the second slider RII recloses the contact a, whereby the change from the main-motor to the auxiliary-motor drive is initiated and the further operations are thereafter repeated in the manner just described. The slider RIII similarly controls the section $a_2$—$b_2$. The last section $a_3$—$b_3$ is controlled by the slider RIV, which projects so much further than the preceding sliders that it can close the contact c (Figure 1a) at the point $c_3$ (Figure 1c). As will be explained with reference to Figure 2, this action prepares for the stopping of the machine, which takes place at the point $b_3$.

The individual parts of the switch means in accordance with Fig. 2 are accommodated for the largest part in the housing GH of Fig. 1. Parts which are outside the housing GH but which are needed for understanding the invention are made a part of the circuit. These are the foot switch FS, the three contacts a, b, c of Fig. 1 controlled by schedule disk Ssh and the contact nk controlled by cam NK with control lamp KL of Fig. 1b. These parts are illustrated in Fig. 2 outside the dot-dash lines.

When the disc Sch is in the zero position, the pilot lamp KL is lit by way of:

$$-, \text{resistance } W_7, nk, o_4, KL, + \quad (1)$$

When the pedal switch FS is closed with the disc in the zero position at the commencement of the sewing schedule, a relay R is energized by way of:

$$+, FS, o_2, \text{relay } R, \text{contact } s_3, nk, W_7, - \quad (2)$$

The relay R is thereafter held by its contact $r_1$ and a resistance $W_5$.

$$+, FS, o_2, \text{relay } R, r_1, \text{resistance } W_5, - \quad (2a)$$

The exciting winding Zw of the clutch Z is energized through relay contact $r_2$ and the main motor Mo is thereby coupled to the machine shaft w:

$$+, \text{contacts } r_2, n_3 \text{ and } m_3, Zw, - \quad (3)$$

The schedule disc Sch begins to rotate, so that the contact nk is changed over. A relay S is thus energized:

$$+, \text{contacts } o_3, r_3, \text{relay } S, nk, W_7, - \quad (4)$$

The lamp KL is put out on change-over of the contact nK. The relay S is held by way of its contact $s_2$.

$$+, o_3, s_2, \text{relay } S, nk, \text{resistance } W_7, - \quad (4a)$$

When the point $a_0$ (Figure 1c) is reached in the sewing pattern, the first slider RI (Figure 1a) closes the contact a, so that the windings MI and MII of a relay M are energized:

$$+, \text{contact } s_5, a, MI, MII, - \quad (5)$$

Of the windings MI and MII, connected in series, MI has a substantially lower resistance than MII and serves merely to delay release of the relay M on its subsequent deenergization because contact $m_4$ short-circuits winding MI.

$$\text{winding MI}, m_4 \quad (5a)$$

The relay M first disconnects the main motor Mo by opening the contact $m_3$ in the circuit of clutch Zw. The relay M also serves to put the auxiliary motor HM in circuit, but does so only after a delay due to the action of two relays RG and RH:

$$+, \text{contacts } m_1, t_2, r_4 \text{ and } rh_5, \text{winding RG}, - \quad (6)$$

The contact $rg_1$ of relay RG causes the relay winding RH to be energized causing contact $rh_5$ to break circuit 6 and release of relay RG:

$$+, \text{contacts } m_1, t_2, \text{ and } rg_1, \text{winding RH}, - \quad (7)$$

In order that the change-over from the main drive to the auxiliary drive may take place with delay, the relays RG and RH have a very slow release. For this purpose, the relay RG is held for some time further through a holding circuit, when contact $rh_5$ is opened by the relay RH. This holding circuit, controlled by the contact $rh_3$ of relay RH comprises a condenser C which is normally charged through a resistance $W_6$ and can discharge through a resistance $W_8$, relay contacts $rh_3$ and the winding of the relay RG once the relay RH has pulled up.

$$+, \text{relay RG, resistance } W_8, rh_3, \text{condenser C, resistance } W_6, - \quad (7a)$$

After the release in succession of the relays RG and RH, a relay T is energized and the latter, by opening its contact $t_2$, prevents a repeated response of relays RG and RH:

$$+, \text{contacts } s_4, n_4, m_2, rg_2 \text{ and } rh_2, T, - \quad (8)$$

The relay T is held through its contact $t_3$, while its contact $t_1$ applies voltage to the relay HR which connects the auxiliary motor:

$$+, \text{contacts } r_2, n_3, \text{ and } t_1, HR, - \quad (9)$$

The auxiliary motor HM is energized and drives the machine at low speed until the reversing point $b_0$ (Figure 1c) in the sewing pattern is reached. At this instant, the first slider RI opens contact a and closes the contact b and a relay N is energized. This causes relay N to respond because relay M is retarded.

$$+, \text{contacts } s_5, b, p, m_5, \text{relay } N, - \quad (10)$$

The contact $n_3$ in the circuit 9 is thereby opened so that the auxiliary motor HM is de-energized. The relay N is held through its contact $n_1$ and one of the relay contacts $s_5$, $rg_3$, $rh_1$, $rb_2$ or $rd_3$:

$$+, [s_5, (rh_1, rg_3, rb_2)rd_3], n_1, N, - \quad (10a)$$

It serves to reverse the direction of feed of the work by means of the magnet PU, to lift the presser foot by means of the magnet FM so that the work can be turned and thereafter when the relay N releases again to engage the clutch Z of the main motor Mo. These operations are controlled by the relay N through the two relays RG and RH and a combination of relays RA to RF. The relay N opens, at its contact $n_4$, the circuit of the relay T, which releases and, by opening its contact $t_1$, again interrupts the circuit of the relay HR so that the coupling Zw can be supplied independently of relay HR. In addition, the relay T causes the circuits of the relays RG and RH to be closed:

$$+, \text{contacts } s_4, n_4, r_4 \text{ and } rh_5, RG, - \quad (11)$$

The relay RG then re-energises the relay RH.

$$+, s_4, n_4, rg_1, \text{relay RH}, - \quad (11a)$$

Now relay RH by means of its contact $rh_5$ interrupts the current supply for relay RG but simultaneously shifts relay RG by way of contact $rh_3$ to the condenser C so that relay RG releases only slowly (see circuit 6a). While releasing relay RG opens its contact $rg_1$ and therefore relay RH also releases, but retardedly. As relay N is still operative relay RG immediately receives current and again becomes active (see circuit 11). Relays RG and RH thus become alternately operative and then release again, and that until as explained later relay N is again disconnected. After the release of the relay RG, the winding RAI of the relay RA is energised:

+, contacts $s_1$, $n_2$, $rg_5$, $rh_4$, and winding RAI, — (12)

The relay RA prepares a circuit by way of contact $ra_1$ for a winding of the relay RB and at the same time and in series therewith a holding winding RAII for relay RA. If relay RH opens its contact $rh_4$ relay RB closes.

+, contacts $s_1$, $n_2$ and $ra_1$, winding RBI of
    relay RB, winding RAII of relay RA,
        winding RAI of relay RA, — (13)

The contact $rb_3$ breaks this circuit and shifts winding RBII of relay RB in the place of winding RAI.

+, $s_1$, $n_2$, $ra_1$, winding RBI, winding
      RAII, $rb_3$, winding RBII, — (13a)

Contact $rb_1$ connects the circuit of winding RCI of relay RC and this in turn connects with its contact $rc_1$ the foot magnet FM.

+, $s_1$, $n_2$, $rb_1$ winding RCI, — (13b)

+, $rc_1$, coil FM, — (13c)

The relays RG and RH again pull up and release in succession. Upon release of the relay RG, the relay RA releases, due to short-circuiting of the winding RAI, whereas the relay RB by way of winding RBII continues to be held through:

+, contacts $s_1$, $n_2$, $rg_5$, $rh_4$ and $rb_3$, RBII — (14)

Upon release of the relay RH, the relay RB is de-energised opening contact $rb_1$ and the relay RD pulls up:

+, contacts $s_1$, $n_2$, $rc_2$, windings RDI and RCII of
    relays RD and RC, $rd_2$ winding RCI, — (15)

The contact $rd_2$ breaks this circuit and shifts winding RDII in the place of winding RCI.

+, contacts $s_1$, $n_2$, $rc_2$ RDI and
        RCII, $rd_2$, RDII, — (16)

Both of the relays RC and RD continue to be held after the response of RD. The contact $rd_1$ energizes the winding REI of the relay E.

+, $s_1$, $rd_1$, $rf_1$, winding of relay REI, — (16a)

The contact $re_1$ energizes the magnet PU and holds the latter in circuit until the next reversing point $b_1$ (Fig. 1c) in the sewing program is reached.

+, $re_1$, PU, — (16b)

The relays RG and RH again pull up and release in succession. The relays RA and RB are thus re-energised. When the relay RB pulls up, the relay RC is caused to release by short circuit at the contact $rb_1$, whereby the foot magnet FM is de-energised. However, the relay RD is held through the contact $rb_1$ and its own contact $rd_2$.

+, $s_1$, $n_2$, $rb_1$, $rd_2$, winding RDII, — (16c)

After pulling up and release of the relays RG and RH for the fourth time after reversing point $b_0$, the relays RA and RB also release again and the relay RD is disconnected by opening of the contact $rb_1$. As a result contact $rd_1$ opens and relay RF operates.

+, $s_1$, $re_2$, winding of relay RFI, winding of
    relay REII, winding of relay REI, — (16d)

Consequently contact $rf_1$ shifts and now both relays RE and RF hold themselves in the following circuit:

+, $s_1$, $re_2$, relay winding RFI, relay winding
      REII, $rf_1$, relay winding RFII, — (16e)

After this fourth operation of relays RG and RH since the reversing point $b_0$, all rest contacts $rh_1$, $rb_2$, and $rd_3$ located in the holding circuit 10a of relay N are opened, and consequently relay N now releases when contact $rg_3$ opens upon release of relay RG. Due to release of relay N both relays RG and RH are brought to rest at point $a_1$. Furthermore, the coupling Zw responds due to release of rest contact $n_3$ and thus couples the motor Mo with the shaft w (circuit 3).

The sewing machine which rested after response of relay N because the auxiliary motor HM had been cut off, now again begins to sew and ultimately arrives at the reversing point $b_1$ in the sewing schedule by way of point $a_1$ which has the same function as point $a_0$.

When this point is reached, the chain of relays RA to RF is again influenced through the two relays RG and RH, with the difference that the relays RE and RF then release in succession. On release of the relay RE, the magnet PU is de-energised, so that the original direction of feed is restored for the sewing section $b_1$ to $b_2$.

As described, the magnet FM has been energised by the contact $rc_1$ during the period of energisation of the relay RC and has lifted the stepper for a few seconds at the point $b_0$, so that the operator has been able to turn the material into the new direction of sewing.

The above-described operations are repeated for the sections from $b_1$ to $b_2$ (Figure 1c) and thereafter for the section from $b_2$ to $b_3$. When the last slider RIV (Figure 1a) becomes operative, a relay P is energized after the disconnection of the main motor Mo and the energisation of the auxiliary motor HM (circuits 5 and 6):

+, contact $s_5$, $c$, winding of relay P, — (17)

The relay P energizes a relay O after the tip $b_3$ (Figure 1a) of the last slider RIV has been passed:

+, contact $s_5$, $b$, contact $p$, O, — (18)

The relay O completes a holding circuit through its contact $o_1$ and the foot magnet FS and opens the circuits (2a) and (4a) by means of its contacts $o_2$ and $o_3$, whereby the whole system is restored to its original condition. The motor drives cannot be re-established until the schedule disc Sch has been returned to the zero position and the relay O has been released by opening the pedal switch FS, so that the pilot lamp KL lights up. During the performance of a sewing pattern, the operator can stop the sewing machine by releasing the pedal switch. In this event, the relay arrangement is capable of restarting the pattern at the point of interruption when the pedal switch is closed again. When the said foot switch is opened, only the relay R releases, the relay S remaining held on.

If desired, provision may be made for adjusting the delay produced by the relays RG and RH.

In the example of Figure 3, FS is the operator's pedal switch, HR is a relay for controlling the auxiliary motor and w is again the machine shaft. In this simplified control system, a number of stitches to be made, as shown two to nineteen, can be pre-set by a manually operated selector switch SW. The stitches actually made by the machine are counted as electric impulses in an automatic step-by-step switching mechanism in the form of a rotary selector comprising wipers $da$, $db$ and $dc$ and the drive by the auxiliary motor is discontinued when the said selector reaches a position corresponding to the set position of the switch SW.

The components which are not mounted directly in the housing are illustrated outside the dot-dash lines.

As long as the wiper of the switch SW remains in the zero position, a relay E is energized by way of contact SWO, $da$O and E winding. When the pedal switch FS is closed, firstly a relay F pulls up and, by its contact $f_2$, energizes the auxiliary-motor relay HR:

+, HR, contacts $h_5$ and $f_2$, — (19)

The machine starts and a contact disc KG on the shaft w performs a number of revolutions corresponding to the number of stitches. At each revolution, a contact ring or coating, interrupted by insulation $s_0$, on the said disc passes over a fixed contact $k$. As long as the switch SW is in the zero position, the number of stitches performed by the machine, that is to say the number of the impulses produced by the contact mechanism $k$, $s_0$ are not counted. Thus, for example, the seam $a_0$ to $b_0$ shown in Figure 1c could be produced simply by operating the pedal switch FS. On the opening of the switch FS, the relay F releases, but the relay HR remains energised until the stitch-operation taking place at the instant of circuit interruption has been completed, because the said relay is held through the contact $k$ and the relay contact $f_3$, which has returned to its inoperative position, until the insulation $s_0$ reaches the contact $k$.

$$+, \text{ winding HR, } f_3, \text{ contact } k, - \quad (19a)$$

If, however, a predetermined number of stitches, for example eight, is set in the switch SW, the relay E first releases, so that its contacts $e_1$, $e_2$, $e_3$ move into the illustrated zero position and thus prepare the counting means. If the motor is then started by operation of the pedal switch FS (circuit 19), the impulses from the contact disc KG are fed to the driving magnet winding D of the selector and the three wipers $da$, $db$ and $dc$ are advanced in succession over respective eleven-step banks of contacts where in the last bank contacts 1″ to 11″ are connected with one another:

$$+, \text{ winding D, contacts } f_1, e_2 \text{ and } h_6, \text{ contact } k, \text{ KG}, - \quad (20)$$

The wipers are advanced step-by-step to the contact 8, where the disconnecting relay H is energized:

$$+, \text{ SW (contact 8)}, da \text{ (contact 8)} g_2, H, - \quad (21)$$

The contact $h_5$ interrupts the circuit of the relay HR, while the contact $h_6$ again ensures that the stitch being made at the instant of the interruption is completed by making a circuit from the contact $k$ to the relay HR.

$$+, \text{ HR relay, } h_6, \text{ contact } k, - \quad (22)$$

At the same time, the selector contact $d_2$ ensures by way of the relay contact $f_3$, that the selector completes its eighth step.

$$+, \text{ winding D, } d_2, f_3, \text{ contact } k, - \quad (23)$$

The relay HR and the magnet D are disconnected when the insulation $s_0$ reaches the contact $k$. A relay H has at the same time established a holding circuit through its own contact $h_2$ and resistance $W_1$.

On the first step, that is when the selector leaves the zero position, contact arm $dc$ prepared a circuit by way of one of contacts 1–11 for the return of the selector.

When the pedal switch FS is opened, the relay F releases and the selector is returned to the initial position O. There is established, through the contact $f_2$, which has returned to the position of rest, the wiper arm $dc$, which now stands on contact 8″, and the contact $h_3$, a circuit for the 300 ohm winding GI of a relay G, which pulls up and energises the driving magnet D through the contact $g_3$.

$$+, W_2, \text{ relay G, } h_3, \text{ contacts 1″ to 11″, selector arm } dc, f_2, - \quad (24)$$

$$+, \text{ winding of magnet D, } g_3, h_4, \text{ contacts 1″ to 11″, selector arm } dc, f_2, - \quad (25)$$

The magnet D, by its contact $d_1$, short circuits the said winding of the relay G, which thus releases and de-energises the magnet D. The said short-circuit is thus broken, so that the relay G pulls up again and re-energises the magnet D which pulls up, short circuiting winding GI and releasing the G relay, thus again disconnecting the winding D of the rotating magnet. These alternating operations are continued until the selector has advanced to the zero position and the wiper arm $dc$ stands on contact O″. The winding (300 ohms) of the relay H is short-circuited through the said contact O″ and the relay H releases. When the pedal switch FS is again closed, the machine will start and stop again after eight further stitches, provided that the switch SW is still set at this number.

If, for example, it is desired to perform nineteen stitches, the switch SW is set to the number 19. On starting the machine, the selector receives impulses from the contact $k$, as described above, and advances its three wipers $da$, $db$ and $dc$ over the contact segments. When the contact 11 is reached, the 1500-ohm winding GII of the relay G is energised.

$$+, \text{ winding GII, contact 11, } da, g_2, H, - \quad (26)$$

The relay H cannot respond at this time and only the relay G pulls up and makes a holding circuit through its own contact $g_1$ and the contact $h_1$.

$$+, \text{ winding GII of G relay, } h_1, g_1, - \quad (27)$$

The contact $g_2$ removes the relay H from the wiper $da$ and connects it to the wiper $db$. After eight further steps (that is, 19 steps in all), the relay H pulls up and breaks the circuit of the motor relay HR, as described above. At the same time, the relay H also breaks, at $h_1$, the holding circuit for the relay G, which immediately releases. The selector is re-set, in the manner already described, after the release of the pedal switch and the consequent release of the relay F.

With this arrangement also, the operator can interrupt the set schedule by opening the pedal switch. On re-closing this switch, the machine completes the remainder of the schedule. For example, if nineteen stitches have been pre-set and the operation is interrupted during the eighth stitch, this stitch is completed and, on re-starting, the machine begins with the ninth stitch and ends with the nineteenth. Thus, the pre-set number of stitches is completed.

Instead of employing a high-speed and a low-speed motor, use may be made of a two-speed pole-changing motor.

Having now described our invention with reference to the embodiments illustrated in the drawings, we do not wish to be limited thereto, but what we desire to protect by Letters Patent of the United States is set forth in the appended claims.

What is claimed is:

1. A sewing machine including a motor drive, circuit interrupting means controlling the operation of said motor drive, a drive shaft operatively connected to said motor drive, a needle bar, a presser foot, a feed dog operatively associated with said drive shaft and automatically operative control means enabling the operator of said sewing machine to predetermine the number and the direction of the stitches produced by said machine; said control means comprising schedule setting means operated in synchronism with said motor drive and including a member actuated by said drive shaft and corelating means including relays and magnets associated with and operative to shift said presser foot, reverse said feed dog and shift said circuit interrupting means to start, stop and change the movements of said motor drive in response to the operation of said schedule setting means.

2. A sewing machine including a motor drive, circuit interrupting means controlling the operation of said motor drive, a drive shaft operatively connected to said motor drive, a needle bar, a presser foot, a feed dog operatively associated with said drive shaft and automatically operative control means enabling the operator of said sewing machine to predetermine the number and the direction of the stitches produced by said machine; said control means comprising schedule setting means operated in synchronism with said motor drive and including a member actuated by said drive shaft and corelating means including relays and magnets associated with and operative to shift said presser foot, reverse said feed dog and shift said circuit interrupting means to start, stop and change the movements including the speed of said motor drive means and thereby the speed of said schedule setting means in response to the operation of said schedule setting means, said member actuated by said shaft being a rotary member presenting cam members or the like adjusted and operative to control the number of rotations of said motor drive and said corelating means including spring contacts acted upon by said rotary member to control the current supply to said relays and magnets.

3. A sewing machine including a motor drive, circuit interrupting means controlling the operation of said motor drive, a drive shaft operatively connected to said motor drive, a needle bar, a presser foot, a feed dog operatively associated with said drive shaft and automatically operative control means enabling the operator of said sewing machine to predetermine the number and the direction of the stitches produced by said machine; said control means comprising schedule setting means operated in synchronism with said motor drive and including a member actuated by said drive shaft and corelating means including relays and magnets associated with and operative to shift said presser foot, reverse said feed dog and shift said circuit interrupting means to start, stop and change the movements including the speed of said motor drive and thereby the speed of said schedule setting means in response to the operation of said schedule setting means, said member actuated by said shaft being a rotary member presenting cam members or the like adjusted and operative to control the number of rotations of said motor drive and said corelating means including spring contacts acted upon by said rotary member to control the current supply to said relays and magnets, said motor drive comprising two motors having different speeds and clutch means controlled by said corelating means for alternately coupling said motors to said shaft.

4. A sewing machine including a motor drive, circuit interrupting means controlling the operation of said motor drive, a drive shaft operatively connected to said motor drive, a needle bar, a presser foot, a feed dog operatively associated with said drive shaft and automatically operative control means enabling the operator of said sewing machine to predetermine the number and the direction of the stitches produced by said machine; said control means comprising schedule setting means operated in synchronism with said motor drive and including a member actuated by said drive shaft and corelating means including relays and magnets associated with and operative to shift said presser foot, reverse said feed dog and shift said circuit interrupting means to start, stop and change the movements including the speed of said motor drive and thereby the speed of said schedule setting means in response to the operation of said schedule setting means, said member actuated by said shaft being a rotary member presenting cam members or the like adjusted and operative to control the number of rotations of said motor drive and said corelating means including spring contacts acted upon by said rotary member to control the current supply to said relays and magnets, said motor drive comprising two motors having different speeds and clutch means controlled by said corelating means for alternately coupling said motors to said shaft, and a switch connected to said corelating means adapted to be actuated by the machine operator during operation of the machine to effect individual operations, interrupt and delay relay operations.

5. A sewing machine including a motor drive, a circuit interrupting means controlling the operation of said motor drive, a drive shaft operatively connected to said motor drive, a needle bar, a presser foot, a feed dog operatively associated with said drive shaft and automatically operative control means enabling the operator of said sewing machine to predetermine the number and the direction of the stitches produced by said machine; said control means comprising schedule setting means operated in synchronism with said motor drive and including a member actuated by said drive shaft and corelating means including relays and magnets associated with and operative to shift said presser foot, reverse said feed dog and shift said circuit interrupting means to start, stop and change the movements including the speed of said motor drive and thereby the speed of said schedule setting means in response to the operation of said schedule setting means, said presser foot and said feed dog being shifted by magnets controlled by relays including one relay adapted to hold said presser foot in raised position for a period of time permitting the operator to shift the direction of the material upon reversal of the direction of sewing by the magnet effective to shift said feed dog.

6. A sewing machine including a motor drive, circuit interrupting means controlling the operation of said motor drive, a drive shaft operatively connected to said motor drive, a needle bar, a presser foot, a feed dog operatively associated with said drive shaft, and control means enabling the operator of said sewing machine to predetermine the number of the stitches produced by said machine in any direction of sewing comprising schedule setting means operated in synchronism with said motor drive and including a member actuated by said drive shaft and corelating means including relays associated with and operative to actuate said circuit interrupting means to corelate the movements of said motor drive and said machine in response to guiding impulses controlled by said schedule setting means, said schedule setting means including a selector switch adjustable to predetermine the required stitch operations and a repeater device defined by a current impulse transmitter.

7. A sewing machine including a motor drive, circuit interrupting means controlling the operation of said motor drive, a drive shaft operatively connected to said motor drive, a needle bar, a presser foot, a feed dog operatively associated with said drive shaft, and control means enabling the operator of said sewing machine to predetermine the number of the stitches produced by said machine in any direction of sewing comprising schedule setting means operated in synchronism with said motor drive and including a member actuated by said drive shaft and corelating means including relays associated with and operative to actuate said circuit interrupting means to corelate the movements of said motor drive and said machine in response to guiding impulses controlled by said schedule setting means, said schedule setting means including a selector switch adjustable to predetermine the required stitch operations and a repeater device defined by a current impulse transmitter, said current impulse transmitter comprising a sliding contact means synchronized to interrupt current only when said needle bar is in reversing position and said actuating means including one relay controlling the motor drive under influence of said contact means in a manner to complete the working operation.

8. A sewing machine including a motor drive, circuit interrupting means controlling the operation of said motor drive, a drive shaft operatively connected to said motor drive, a needle bar, a presser foot, a feed dog operatively associated with said drive shaft, and control means enabling the operator of said sewing machine to predetermine the number of stitches produced by said machine in any direction of sewing comprising schedule setting means operated in synchronism with said motor drive means and including a member actuated by said drive shaft and corelating means including relays associated with and operative to actuate said circuit interrupting means to corelate the movements of said motor drive means and said machine in response to guiding impulses controlled by said schedule setting means, said motor drive comprising two motors having different speeds and clutch means controlled by said corelating means for alternately coupling said motors to said shaft.

References Cited in the file of this patent

UNITED STATES PATENTS

| 2,722,184 | Sweet | Nov. 1, 1955 |
| 2,759,444 | Schwab et al. | Aug. 21, 1956 |
| 2,803,207 | Sotzky | Aug. 20, 1957 |

FOREIGN PATENTS

| 489,740 | Canada | Jan. 20, 1953 |